(12) United States Patent
Deschamps (10) Patent No.: US 9,088,739 B2
(45) Date of Patent: Jul. 21, 2015

(54) CMOS IMAGE SENSOR HAVING A WIDE LINEAR DYNAMIC RANGE

(75) Inventor: Benoît Deschamps, Sassenage (FR)

(73) Assignee: STMicroelectronics SA, Montrouge (FR)

( * ) Notice: Subject to any disclaimer, the term of this patent is extended or adjusted under 35 U.S.C. 154(b) by 1003 days.

(21) Appl. No.: 13/045,211

(22) Filed: Mar. 10, 2011

(65) Prior Publication Data

US 2011/0221944 A1    Sep. 15, 2011

(30) Foreign Application Priority Data

Mar. 11, 2010    (FR) ...................................... 10 00976

(51) Int. Cl.
*H04N 5/355* (2011.01)
*H04N 5/374* (2011.01)
*H04N 5/363* (2011.01)

(52) U.S. Cl.
CPC ....... *H04N 5/35536* (2013.01); *H04N 5/35545* (2013.01); *H04N 5/35554* (2013.01); *H04N 5/363* (2013.01); *H04N 5/374* (2013.01)

(58) Field of Classification Search
CPC ..... H04N 5/374; H04N 3/1506; H04N 5/341; H04N 5/345; H04N 5/3452; H04N 3/1512; H04N 5/3741; H04N 5/3742; H04N 5/3743; H04N 5/3745; H04N 5/37452; H04N 5/37455; H04N 5/37457
USPC .................................................. 348/302–324
See application file for complete search history.

(56) References Cited

U.S. PATENT DOCUMENTS

| | | | |
|---|---|---|---|
| 7,586,523 B2 | 9/2009 | Egawa et al. | |
| 2006/0208161 A1* | 9/2006 | Okita et al. | 250/208.1 |
| 2007/0097240 A1* | 5/2007 | Egawa et al. | 348/308 |
| 2008/0258045 A1 | 10/2008 | Oike et al. | |

OTHER PUBLICATIONS

Sugawa et al., "A 100 dB Dynamic Range CMOS Image Sensor Using a Lateral Overflow Integration Capacitor", ISSCC 2005/Session 19/Imagers/19.4, Digest of Technical Papers, 2005 IEEE International Solid-State Circuit Conference, Feb. 8, 2005, pp. 352-353, 603.).*

Hertel, D. et al., "An adaptive multiple-reset CMOS wide dynamic range imager for automotive vision applications," 2008 IEEE Intelligent Vehicles Symposium. Eindhoven, The Netherlands, Jun. 4-6, 2008, pp. 614-619.

* cited by examiner

*Primary Examiner* — Nelson D. Hernández Hernández
(74) *Attorney, Agent, or Firm* — Seed IP Law Group PLLC (57) ABSTRACT

The disclosure relates to a process of controlling a pixel cell of an image sensor of the CMOS type, comprising the steps of: initializing a sense node and a read node of the pixel cell; partially transferring electrical charges accumulated at the sense node to the read node; completely evacuating electrical charges accumulated at the read node; partially transferring electrical charges accumulated at the sense node to the read node; measuring the electrical charges accumulated at the read node to obtain a pixel signal corresponding to a quantity of electrical charges accumulated during a short integration period; completely transferring electrical charges accumulated at the sense node to the read node, without a prior initialization of the read node, and measuring the electrical charges at the read node to obtain a pixel voltage corresponding thus to the sum of the electrical charges accumulated during the short and long integration periods.

13 Claims, 6 Drawing Sheets

CMOS IMAGE SENSOR HAVING A WIDE LINEAR DYNAMIC RANGE

BACKGROUND

1. Technical Field

The present disclosure relates to an image sensor, in particular of the CMOS type, such as those that equip digital still-photo cameras, digital video cameras, and mobile telephones. The present disclosure relates in particular to circuits to read and to amplify signals supplied by photosensitive elements of the image sensor.

2. Description of the Related Art

Conventionally, an image sensor of the CMOS type comprises pixel cells arranged in lines and in columns transversal to the lines. Each pixel cell is formed in a semiconductor substrate and comprises a photosensitive component such as a photodiode, associated with a read circuit. The read circuit comprises at least one transistor to transfer a charge accumulated in a charge accumulation region of the substrate where the photosensitive component is formed, which will hereinafter be called "sense node", to a read node, and a transistor to reinitialize the read node to a certain charged value before proceeding with a new charge transfer from the sense node. The image sensor also comprises a control circuit and a processing circuit. In particular, the control circuit controls the shutter speed (electronic shutter). The processing circuit processes the signal from each pixel that is supplied by the read circuit.

Figure 1:
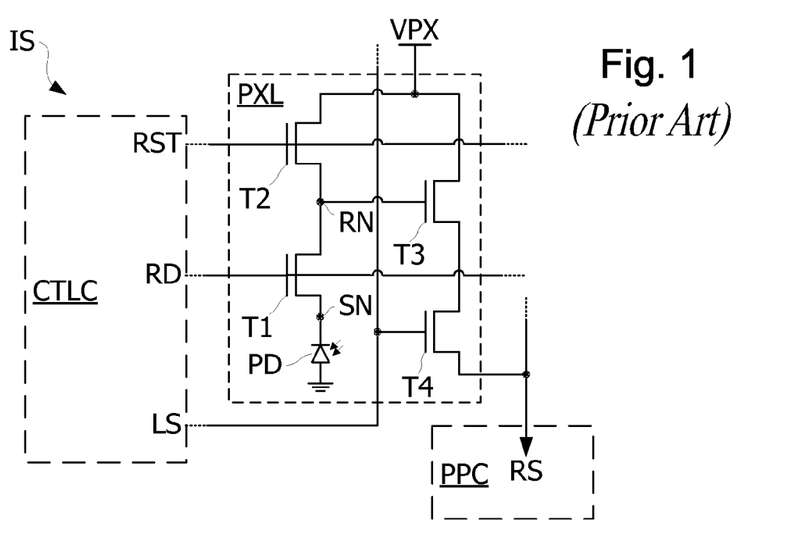
FIG. 1, previously described, shows schematically an image sensor of the CMOS type and a pixel cell, FIG. 2, previously described, shows timing diagrams illustrating a control mode of a pixel cell of the image sensor, FIG. 3, previously described, shows timing diagrams illustrating another control mode of the pixel cell, FIG. 4, previously described, shows curves illustrating a photoelectric conversion feature of the image sensor.

FIG. 1 shows schematically an image sensor of the CMOS type. The image sensor conventionally comprises pixel cells arranged in lines and in columns transversal to the lines of pixels. For clarity reasons, only a single pixel cell PXL is shown in FIG. 1. The image sensor IS also comprises a pixel cell control circuit CTLC and a processing circuit PPC of the signal supplied by each pixel cell. The image sensor IS shown in FIG. 1 is of the four transistors per pixel cell type. Thus, each pixel cell PXL of the image sensor IS comprises four N-channel transistors T1, T2, T3, T4 and a photodiode PD of which an anode terminal is connected to ground. The transistor T1 comprises a source terminal connected to a cathode terminal of the photodiode PD and constituting a sense node SN, a drain terminal connected to a source terminal of the transistor T2 and constituting a read node RN, and a gate terminal receiving a read control signal RD. The transistor T2 comprises a drain terminal receiving a pixel supply voltage VPX and a gate terminal receiving a reset signal RST. The transistor T3 comprises a gate terminal connected to the read node RN, a drain terminal receiving the supply voltage VPX, and a source terminal connected to a drain terminal of the transistor T4. The transistor T4 comprises a gate terminal receiving a column selection signal LS and a source terminal supplying a pixel signal RS. Moreover, the gate of the transistor T1 and the gate of the transistor T2 of each of the pixel cells of a same pixel line receive respectively the same signal RD and the same signal RST. The gate of the transistor T4 of each of the pixel cells of a same pixel line receives a same signal LS. The source of the transistor T4 of each of the pixel cells of a same column of pixels is connected to a unique output supplying the pixel signal RS.

Figure 2:
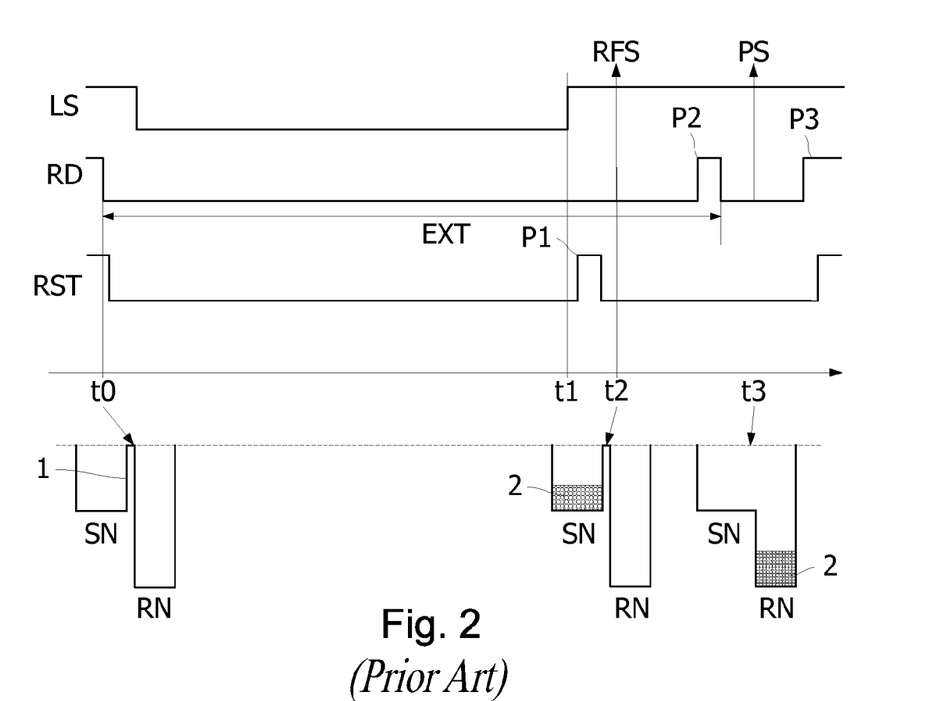

FIG. 2 shows timing diagrams of command signals RD, RST, and LS applied to each pixel cell PXL by the circuit CTLC during a read cycle. FIG. 2 also show charges accumulated at the sense node SN and at the read node RN at different moments. The nodes SN are RN are shown in the form of wells separated by a barrier 1 formed by the transistor T1.

The control of a pixel cell conventionally comprises four distinct moments t0, t1, t2, t3. Before moment t0, the electric charges accumulated by the photodiode PD at the sense node SN were transmitted to the read node RN upon the passage to 1 of the signal RD setting the transistor T1 in the conducting state, and the charges at node RN are evacuated to the supply source by setting the transistor T2 in the conducting state with the aid of the signal RST set at 1. Moment t0 occurs when the signal RD goes to 0, blocking the transistor T1, and when the sense node SN and read node RN are void of electrical charges. Moment t0 thus marks the beginning of an integration period (or exposition time) EXT during which the photodiode PD is exposed to the light and accumulates electrical charges at the sense node SN. Moment t1 marks the start of a read phase. This moment occurs when signal LS goes to 1, and is followed by a pulse P1 in the signal RST, allowing it to assure itself that the read node RN is void of all electrical charges. At moment t2, the pulse P1 is followed by a read of the voltage of the pixel signal RS supplying a reference voltage RFS corresponding to an absence of lighting of the diode PD. The voltage RFS is used to initialize an analog/digital converter of the circuit PPC, supplying digital samplings of an image signal. At moment t2, electrical charges have accumulated at the sense node SN since the start of the integration period EXT. Moment T2 is followed by a pulse P2 in the signal RD. The pulse P2 has the effect of making the transistor T1 conducting (removal of the barrier 1) and therefore to transfer the charges 2 accumulated at the node SN to the node RN. Moment t3 occurs after the emission of the pulse P2 and marks the moment of reading the voltage of the signal RS supplying a voltage PS corresponding to the electrical charges 2 present at node RN. Moment t3 is followed by a pulse P3 of the signal RST allowing all the charges found at the node RN to be evacuated to the supply, corresponding to moment t0.

Due to the increased miniaturization of image sensors and thus of the pixel cells, the charges susceptible of being accumulated by the photodiodes are weaker and weaker and saturation of the sense node happens with a lower and lower amount of exposition light. As a result, a reduction of the dynamic range of a pixel occurs, that is to say the range of light that a pixel of an image sensor is capable of discriminating. To avoid this inconvenience, and thus to increase the dynamic range of an image sensor of the CMOS type in certain lighting conditions of the image sensor, it has been proposed, in particular in the patent U.S. Pat. No. 7,586,523, to implement two integration periods and to read two pixel signals corresponding to these two integration periods in a wider dynamic mode.

Figure 3:
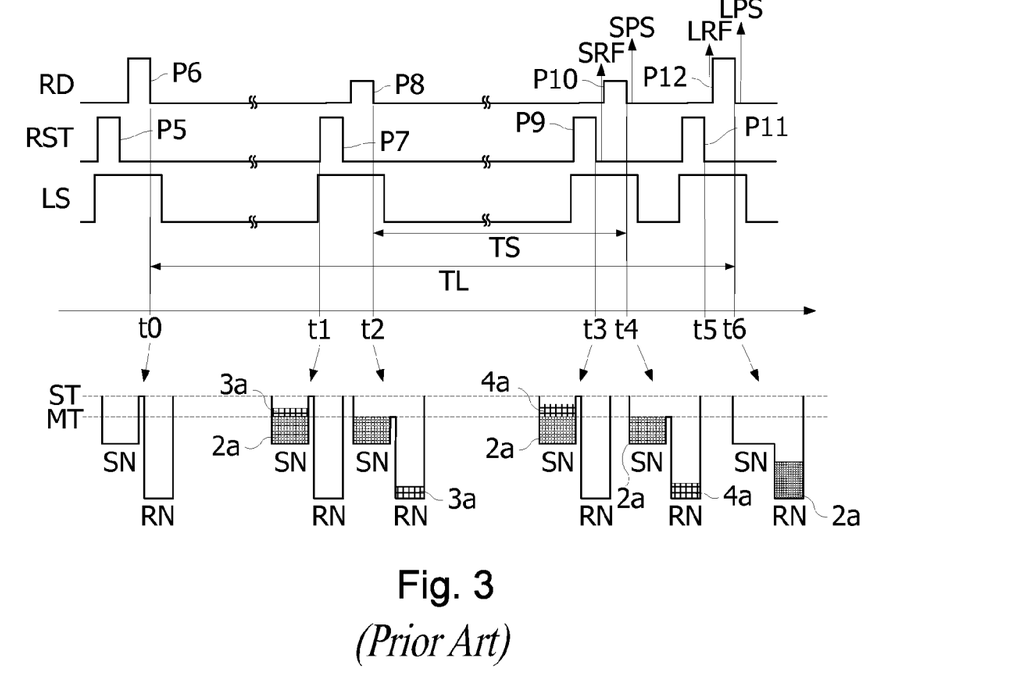

The implementation of two integration periods is shown in FIG. 3, which shows timing diagrams of command signals RD, RST, and LS applied to each pixel cell PXL of FIG. 1. FIG. 3 also shows the charges accumulated at the sense node SN and read node RN at different moments during a read cycle of the pixel cell PXS.

In FIG. 3, the control of a pixel cell comprises seven successive distinct moments t0, t1, t2, t3, t4, t5, t6 in an increased dynamic mode. Before moment t0, the read node RN is initialized by evacuating the electrical charges accumulated at the node RN to the supply voltage VPX, by setting the transistor T2 in the conducting state, controlled by a pulse P5 of the signal RST. The electrical charges accumulated by the photodiode PD at the sense node SN are then transferred to the read node RN under the effect of a pulse P6 of the signal RD setting the transistor T1 in the conducting state. At moment t0, the signal RD goes to 0, blocking the transistor T1, and the sense node SN is void of electrical charges.

Moment t0 thus marks the start of a long integration period TL during which the photodiode PD may accumulate under the effect of the light electrical charges 2a, 3a at the sense node SN. Moment t1 corresponds to the appearance of a pulse P7 in the signal RST. The pulse P7 controls the initialization of the read node RN. Moment t2 corresponds to the appearance of a pulse P8 in the signal RD. The pulse P8 has an intensity less than that of the pulse P6, for example on the order of half the intensity of the pulse P6, so as to partially lower the barrier 1 formed by the transistor T1, and to transfer only the electrical charges 3a exceeding a certain threshold MT from the sense node SN to the read node RN. The threshold MT is thus defined by the intensity of the pulse P8. The charges 3a are evacuated to the supply during a pulse P9 of the signal RST initializing the node RN, the pulse P9 being emitted before moment t3. The pulses P8 and P9 therefore allow for a performance of a skimming operation of the charges accumulated at the node SN. Moment t2 also marks the start of a short integration period TS. At moment t3, just after the pulse P9, a read of the voltage of the pixel signal RS is done to obtain a reference voltage SRF corresponding to an absence of lighting of the diode PD. The voltage SRF is used to initialize the analog/digital converter, which supplies digital samplings of the image signal, during the determination of a "short" pixel signal resulting from the short integration period TS. The read of the voltage SRF is followed by a pulse P10 of the signal RD having an intensity analogous to that of the pulse P8, allowing for the transfer of electrical charges 4a exceeding the threshold MT of the node SN to the node RN. Moment t4 follows the emission of the pulse P10 and marks the end of the short integration period TS and of the moment of reading the voltage of the signal RS supplying a "short" pixel signal SPS corresponding to the electrical charges 4a transferred to the node RN and accumulated during the short integration period TS. Moment t4 is followed by a pulse P11 of the signal RST at moment t5, allowing the charges 4a that may be found at node RN to be evacuated. Just after the pulse P11, a read of the voltage of the pixel signal RS is done to obtain a reference voltage LRF corresponding to an absence of lighting of the diode PD. The voltage LRF allows for the initialization of the analog/digital converter during the determination of a "long" pixel signal resulting from the long integration period TL. The reading of the voltage LRF is followed by a pulse P12 of the signal RD having an intensity analogous to that of the pulse P6, to transfer all the electrical charges present at the node SN to the node RN. Moment t6 follows the emission of the pulse P12 and marks the end of the long integration period TL and of the reading of the voltage of the signal RS supplying a "long" pixel signal LPS corresponding to the electrical charges 2a transferred to the node RN and accumulated during the long integration period TL.

The image sensor described in the patent U.S. Pat. No. 7,586,523 then supplies a pixel value having a wide dynamic range by applying the following formula:

$$WDR = MAX(LS + SS \times GA, SS \times GA \times R) \quad (1)$$

wherein MAX(a , b) is a function supplying the largest number of values a and b, LS and SS are digitized samplings of the signals LPS and SPS, GA is a coefficient that may be equal to 1, and R=TL/TS is the ratio between the long integration TL and short integration TS durations.

Figure 4:
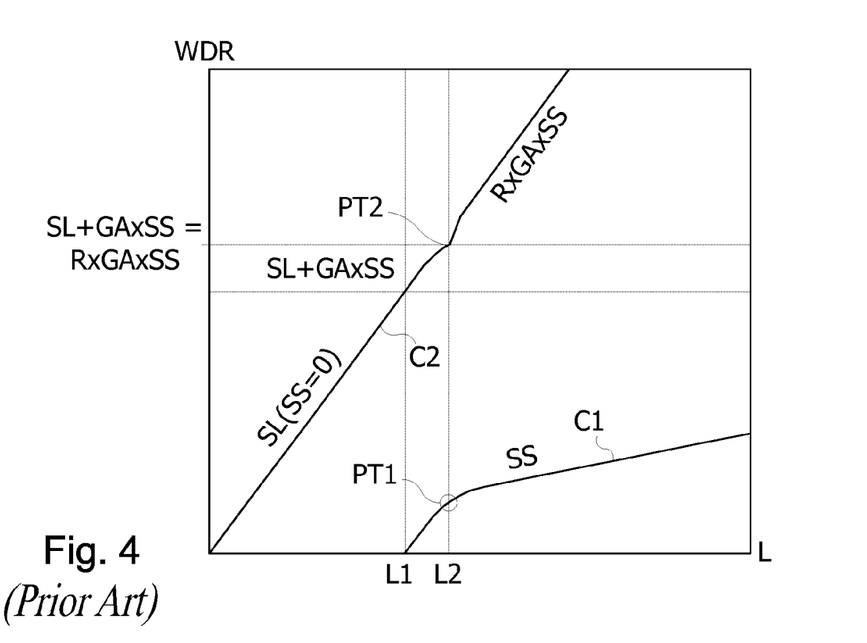

FIG. 4 shows two variation curves C1, C2 of signals SS and WDR as a function of the lighting intensity of the diode PD. According to the curve C1, the signal SS becomes non-zero as from a certain value of lighting intensity corresponding to the threshold MT. The curve C1 thus presents a part that is substantially linear, linked by a curved part near a point PT1 to another linear part with a shallower slope. The curve C2 presents a first part that is substantially linear going from the origin of the reference point where the signal WDR is zero when the lighting of the diode PD is zero, until a point having a lighting intensity equal to L1 at the starting point of the curve C1. In this first part, the signal WDR is equal to the signal SL, the signal SS being zero. The curve C2 comprises a second part extending beyond the first part of the curve C2 and a point PT2, where the signal WDR is equal to SL+GA×SS for a lighting intensity L2, that is to say when the condition SL+GA×SS>GA×R×SS is met. The curve C2 comprises a third part extending beyond point PT2 where the signal WDR is equal to GA×R×SS, that is to say when the condition SL+GA×SS<GA×R×SS is met. At a certain distance from the point PT2, the first and third parts of the curve C2 have essentially identical slopes, corresponding to an operating zone that is substantially linear.

It so happens that the implementation of the formula (1) causes signal linearity problems near the point PT2 where the values LS+SS×GA and SS×GA×R are close, in particular due to the presence of the curved part of the curve C1 near point PT1. The difference between a straight line having the slope of the first and third parts and the curve C2 may therefore reach 12 to 15%. In the U.S. Pat. No. 7,586,523, it was attempted to reduce this non-linearity by adjusting the coefficient GA or by the use of several coefficients applied to the signal SS, depending on whether it is added to the signal SL or multiplied by the ratio R. However, these operations cause a deterioration of the resulting signal to noise ratio WDR without a significant reduction of the non-linearity.

BRIEF SUMMARY

One embodiment of the disclosure increases the dynamic of the image signal supplied by an image sensor of the CMOS type by limiting as much as possible the deterioration of the image quality of the image signal, in particular as far as the linearity of the signal and the level of noise are concerned.

Embodiments of the disclosure may relate to a process of controlling a pixel cell of an image sensor of the CMOS type, the process comprising steps consisting of: initializing a sense node and a read node of the pixel cell; partially transferring electrical charges accumulated at the sense node since the initialization of the sense node, to the read node; completely evacuating electrical charges accumulated at the read node; partially transferring electrical charges accumulated at the sense node to the read node, and performing a first measurement of electrical charges accumulated at the read node to obtain a first pixel voltage corresponding to a quantity of electrical charges accumulated during a short integration period; and completely transferring electrical charges accumulated at the sense node to the read node, and performing a second measurement of electrical charges at the read node to obtain a pixel voltage for a long integration period. According to an embodiment, the second measurement is performed without evacuating the electrical charges accumulated at the read node after the first measurement, the pixel voltage supplied at the second measure corresponding thus to the sum of the electrical charges accumulated during the short and long integration periods.

According to an embodiment, the process comprises steps of analog/digital conversion of first and second pixel voltages, to obtain a first pixel lighting value corresponding to the first measurement and a second pixel lighting value corresponding to the second measurement.

According to an embodiment, the process comprises a step of measuring electrical charges at the read node to obtain a pixel reference voltage, following the step of completely evacuating the electrical charges accumulated at the read node, the analog/digital conversions of the first and second pixel voltages being initialized with the aid of the pixel reference voltage.

According to an embodiment, the transfers of electrical charges between the sense node and the read node are controlled by pulses of which the amplitude is adjusted as a function of a dynamic of an analog/digital converter performing the analog/digital conversions, so as to avoid that this latter is saturated during the analog conversions, and so that the first pixel voltage can reach a full dynamic of the analog/digital converter.

According to an embodiment, the process comprises a step of supplying a resultant pixel lighting value equal to the largest of the quantities SL+SS and R×SS, SS being the first lighting value, SL+SS being the second lighting value, and R being the ratio between the long and short integration periods.

According to an embodiment, the process comprises a step of supplying a resultant pixel lighting value equal to the largest of the quantities SL+SS+A×SS and R×SS, SS being the first lighting value, SL+SS being the second lighting value, A being a coefficient, and R being the ratio between the long and short integration periods.

According to an embodiment, the process comprises steps of comparing the first lighting value to a threshold and, if the first lighting value is less than the threshold, of forcing the first lighting value to zero before it is multiplied by the coefficient A.

According to an embodiment, the coefficient A is adjusted as a function of the image sensor manufacturing conditions.

According to an embodiment, the coefficient A is adjusted in real-time as a function of the ambient temperature of the image sensor.

Some embodiments of the disclosure also relate to an image sensor of the CMOS type comprising pixel cells arranged in lines of pixels and in columns of pixels transversal to the lines of pixels, each pixel cell being controlled by a pixel control circuit and connected to a pixel signal processing circuit, each pixel cell comprising a sense node connected to a photosensitive component and a read node linked to the sense node by the intermediary of a transistor, the read node being linked to a pixel cell power source by the intermediary of a transistor. According to an embodiment, each pixel cell is controlled by the control circuit in conformance with the process previously described.

According to an embodiment, each pixel cell comprises a transistor controlled by the read node and comprising a terminal linked to the pixel cell power source and a terminal connected to another transistor controlled by a selection signal of a pixel to be read, and comprising a terminal supplying, to the pixel signal processing circuit, a pixel signal corresponding to the electrical charges found at the read node.

BRIEF DESCRIPTION OF THE SEVERAL VIEWS OF THE DRAWINGS

Figure 5:
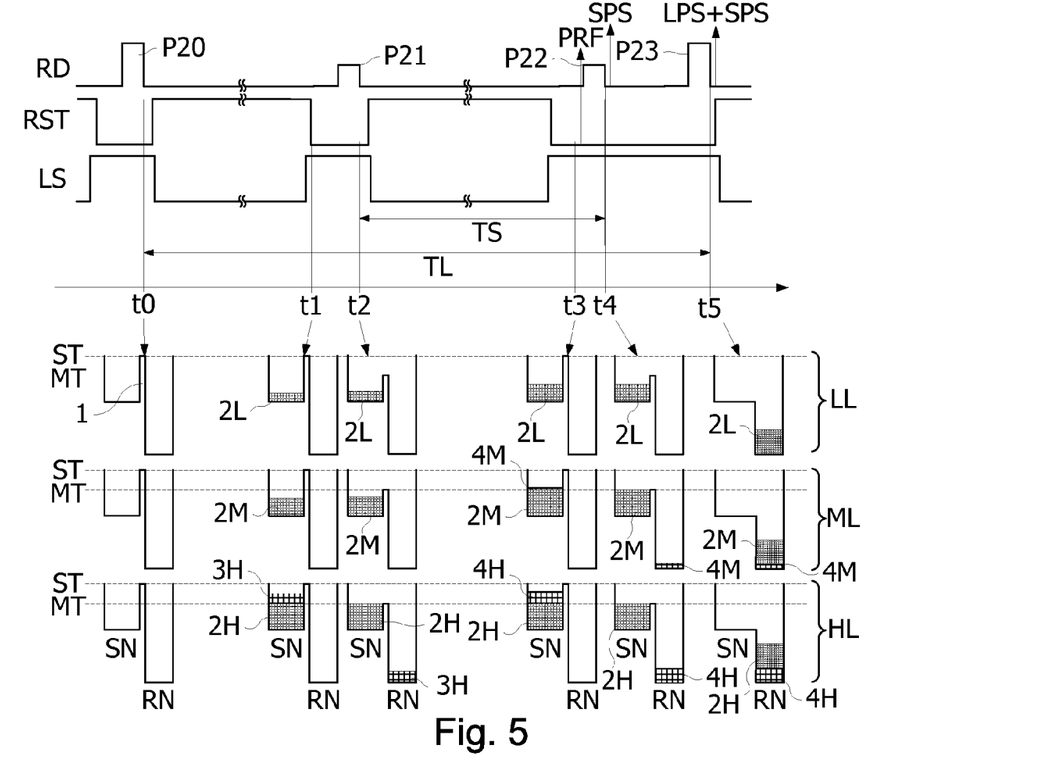
FIG. 5 shows timing diagrams showing a control mode of the pixel cell of FIG. 1, according to one embodiment.

Embodiment examples of the disclosure will be described in the following, in a non-limiting manner and in relation with the appended figures among which:

FIG. 5 shows timing diagrams of control signals RD, RST, and LS applied to each pixel cell PXL such as that shown in FIG. 1, according to one embodiment. FIG. 5 also shows the charges accumulated at the sense node SN and read node RN at different moments and for a low lighting LL intensity, a medium lighting ML intensity, and a high lighting HL intensity of the photodiode PD.

DETAILED DESCRIPTION

In FIG. 5, the control of a pixel cell PXL such as that shown in FIG. 1 comprises six successive distinct moments t0, t1, t2, t3, t4, and t5 in a wide dynamic mode. Before moment t0, the read node RN is initialized by evacuating the electrical charges at the node RN to the power source PXS by setting the transistor T2 into a conducting state, controlled by setting the signal RST to 1. While the transistor T2 is conducting, the electrical charges accumulated by the photodiode PD at the sense node SN are equally transferred to the read node RN under the effect of a pulse P20 of the signal RD controlling the transistor T1 in the conducting state. At moment t0, the signal RD goes to 0, blocking the transistor T1, and the sense node SN is void of electrical charges. Moment t0 thus marks the beginning of a long integration period TL during which the photodiode PD may accumulate electrical charges 2L, 2M, 2H, 3H, 4M, 4H under the effect of the light. At moment t1, the signal RST is set to 0 just before the appearance of a pulse P21 in the signal RD. The pulse P21 has an intensity less than that of the pulse P20, for example on the order of half the intensity of the pulse P20, in a manner so as to partially lower the barrier 1 formed by the transistor T1, and thus to only transfer the electrical charges 3H exceeding a certain threshold MT from the sense node SN to the read node RN. The threshold MT is therefore defined by the intensity of the pulse P21. Thus, under a low lighting LL or medium lighting ML, the electrical charges accumulated by the photodiode PD at the sense node SN do not exceed the threshold MT and therefore no electrical charges are transferred to the read node RN. Under a high lighting HL, the electrical charges 3H exceeding the threshold MT are transferred to the node RN. At moment t2, after the pulse P21, the signal RD goes back to 0. Moment t2 marks the start of a short integration period TS. Just after moment t2, the signal RST is set to 1 to initialize the read node, that is to say to evacuate the electrical charges 3H found at the node RN to the voltage VPX. The pulse P21 thus allows for a skimming of excess electrical charges 3H accumulated at the node SN. A read phase then occurs during which the signal LS goes to 1, then the signal RST goes to 0. During the read phase, at moment t3 just after the signal RST goes to 0, a read of the voltage of the pixel signal RS is performed to obtain a reference voltage PRF corresponding to an absence of lighting of the diode PD. The voltage PRF is used to initialize an analog/digital converter supplying digitized samplings of the image signal. The read of the voltage PRF is followed by a pulse P22 of the signal RD having an intensity analogous to that of the pulse P21, allowing electrical charges 4M, 4H exceeding the threshold MT at the node SN to be transferred to the node RN if necessary. Moment t4 occurs following the emission of the pulse P22 and marks the end of the short integration period TS and of the reading of the voltage of the signal RS. Under a low lighting LL, no electrical charges are transferred from the node SN to the node RN. Under a medium lighting ML, a small quantity of electrical charges 4M is transferred to the node RN. Under a high lighting HL, a greater quantity of electrical charges 4H is transferred to the node RN. At moment t4, the reading of the signal RS supplies a "short" pixel signal SPS corresponding to the electrical charges 4M, 4H transferred to the node RN.

According to an embodiment, the read phase finishes by a pulse P23 appearing in the signal RD at moment t5, then by the increase of the signal RST and the signal LS going to 0. The pulse P23 has an intensity analogous to that of the pulse P20, to transfer all the electrical charges present at the node SN to the node RN. Moment t5 marks the end of the long integration period TL and is followed by the reading of the voltage of the signal RS on output of the pixel cell PXL. The reading of the voltage RS supplies a signal corresponding to the sum of the electrical charges 2L, 2M, 2H accumulated during the long integration period TL and of electrical charges 4M, 4H accumulated during the short integration period TS, that is to say a "long" pixel signal LPS added to the short pixel signal SPS. In fact, the read node RN is not initialized by the signal RST going to 1 between the end of the period TS and the end of the period TL. The electrical charges 4M, 4H corresponding to the short pixel signal were therefore not evacuated before the transfer of all the electrical charges present at the node SN to the node RN, and before the reading of the long pixel signal. This arrangement allows for the re-initialization of the analog/digital converter during the read phase of short and long pixel values to be avoided, and therefore to not have to read two times the reference voltage of the pixel corresponding to an absence of lighting of the diode PD. About 20% of the read time of a pixel is thereby saved. It so happens that this also allows a resulting noise to be obtained in the cumulated value of long and short pixels SPS+LPS that is much less than that of two independent readings of the short pixels SPS and long pixels LPS. Indeed, the partial transfer of electrical charges between the sense node SN and the read node, in particular between the moments t3 and t4, induces a thermal noise kTC resulting from the presence of an intrinsic resistance and an intrinsic capacitance C at each sense and read node, k being the Boltzmann constant, and T being the ambient temperature. The fact of not having to reinitialize the read node RN between the reading of the signal SPS and the reading of the signal SPS+LPS prevents any loss of electrical charges, and therefore a compensation of the thermal noise generated by the transfers of electrical charges through the transistor Ti between moments t3 and t5.

It is to be noted that the signal RST remains at 1 during the periods where the signal LS is at 0, that is to say during the periods where the pixel is not selected to perform a read. This disposition prevents electrical charges susceptible of appearing by electronic diffusion at the read node, notably due to a high lighting, from being taken into consideration in the pixel signal.

The intensity of pulses P21, P22 of the signal RD, controlling the partial transfer of electrical charges at moments t2 and t3, may be adjusted as a function of the dynamic of the analog/digital converter, in a manner so as to avoid the saturation of this latter during the processing of signals SPS and LPS+SPS, and so that the short pixel signal SPS may reach the full dynamic of the analog/digital converter.

Figure 6:
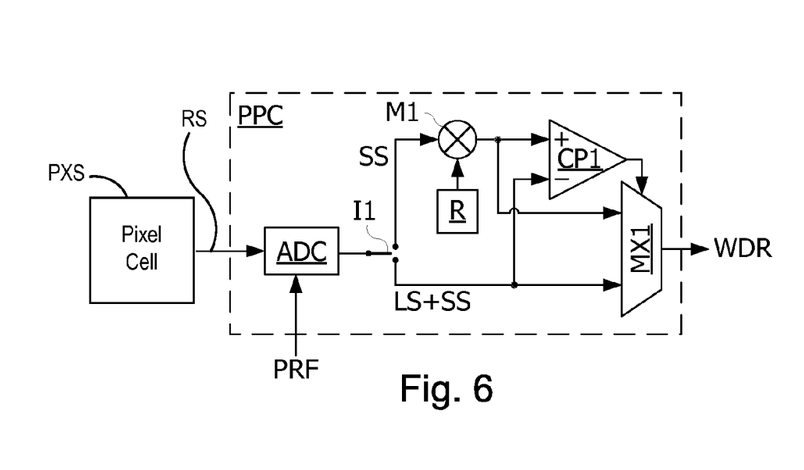
FIG. 6 shows a pixel signal calculation circuit, according to one embodiment.

FIG. 6 shows a processing circuit PPC coupled to an output of a pixel cell PXS, according to one embodiment. The pixel cell PXS can be implemented by the pixel cell PXL of FIG. 1 or by an alternative known pixel cell. The processing circuit PPC is configured to process the signal RS output by the pixel cell PXS.

The circuit PPC comprises an analog/digital converter ADC, a switch I1, a multiplier M1, a comparator CP1, and a multiplexor MX1. The converter ADC receives the pixel signals SPS, SPS+LPS read on the pixel signal line RS at the end of each integration period TL, TS, as well as the pixel reference voltage PRF allowing a correspondence between a zero lighting of the pixel cell PXS and a pixel signal voltage to be established. The output of the converter ADC is connected to the switch I1, which comprises a terminal connected to an input of the multiplexor MX1 and to an input of the comparator CP1, and a terminal connected to the multiplier M1. The switch I1 allows the signal LS+SS to be sent to the multiplexor MX1 and the comparator CP1, and allows the signal SS to be sent to the multiplier M1. The signal LS+SS corresponds to the digitization by the converter ADC of the signal LPS+SPS on output of a pixel cell PXS at moment t5 (FIG. 5). The signal SS corresponds to the digitization of the signal SPS on output of the cell PXS at moment t4. The multiplier M1 receives on another input a value R equal to the ratio between the long and short integration period durations (=TL/TS). The output of the multiplier M1 is connected to an input of comparator CP1 and to an input of the multiplexor MX1. The output of the comparator CP1 controls the multiplexor MX1, in a manner such that this latter supplies the largest value among the input values of the multiplexer MX1 to the pixel signal output WDR of the circuit PPC. Thus, the circuit PPC supplies a pixel value WDR calculated in the following manner:

$$WDR = MAX(LS+SS, R \times SS) \qquad (2)$$

The ratio R between the long integration TL and short integration TS durations may be adjustable, for example to 1, 4, or 8, as a function of the amount of contrast of the image supplied by the image sensor, knowing that the quality of an image supplied by the image sensor has the tendency to lessen when the ratio R increases. When the ratio R is set at 1 (for an image with low contrast), the pixel cell is controlled in conformance with the control mode shown in FIG. 2, that is to say, by implementing a single integration period EXT. The duration of integration periods TL and TS is also adjusted as a function of the quantity of light received by the image sensor by maintaining the ratio R at the chosen value.

Figure 7:
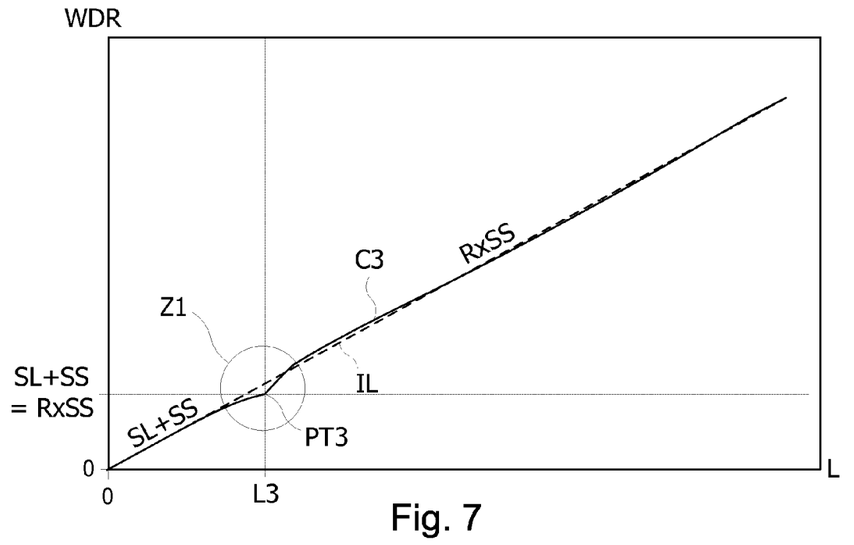
FIG. 7 shows a variation curve of the pixel signal on output of the circuit of FIG. 6, as a function of the lighting intensity of the pixel cell.

FIG. 7 shows a response curve C3 of the pixel cell PXS circuit coupled to the processing circuit PPC, as a function of the lighting intensity L of the pixel cell PXS. FIG. 7 shows that the curve C3 substantially coincides with a straight line IL over a relatively large range, with the exception of a non-linear zone Z1 where the curve C3 is not linear. The zone Z1 includes a junction point PT3 between response curves corresponding to equations WDR=LS+SS and WDR=R×SS.

The point PT3 is reached when the lighting intensity of the pixel cell is equal to a value L3.

Figure 8:
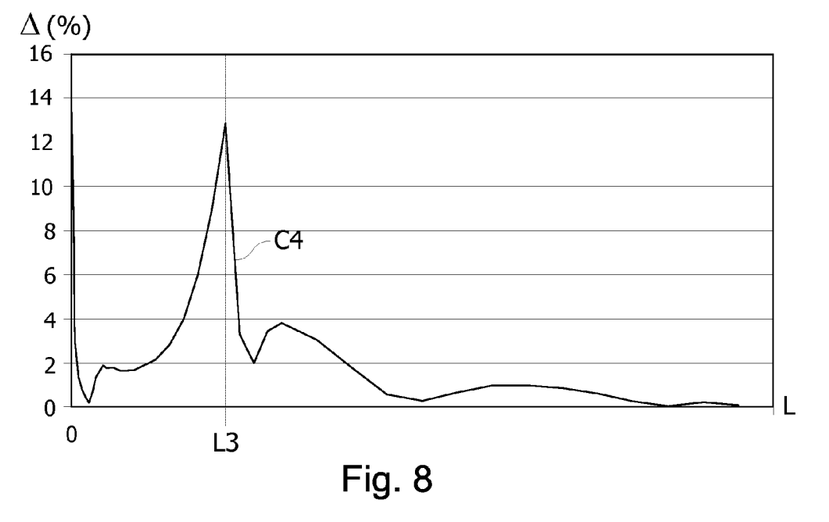
FIG. 8 shows a variation curve of a difference between the curve of FIG. 7 and a straight line corresponding to a linear response curve of the image sensor.

FIG. 8 shows a variation curve C4 of the difference between the curve C3 and the straight line IL. FIG. 8 shows that, with the exception of the zone Z1 of FIG. 7 wherein a peak of approximately 13% is reached when the lighting intensity is equal to L3, the difference between the curve C3 and the straight line IL remains less than 4%.

Figure 9:
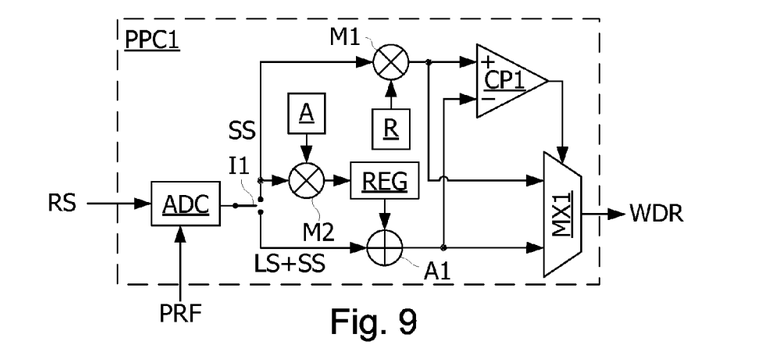
FIG. 9 shows a pixel signal calculation circuit, according to another embodiment.

FIG. 9 shows a processing circuit PPC1 for processing the signal RS on output of the pixel cell PXS, according to another embodiment. The circuit PPC1 differs from the circuit PPC in that it comprises an adder A1 interposed between the switch I1 and the multiplexer MX1 or the comparator CP1, a multiplier M2, and a register REG. Thus, the switch I1 comprises a terminal connected to the adder A1 and a terminal connected to the multipliers M1, M2. The switch I1 allows to send to the adder A1 the signal LS+SS corresponding to the digitization by the converter ADC of the signal LPS+SPS on output of a pixel cell PXS at moment t5 (FIG. 5), and to the multipliers M1, M2 the signal SS corresponding to the digitization of the signal SPS on output of the cell PXS at moment t4. The multiplier M2 receives, on another input, the value of a coefficient A and supplies the value A×SS to the input of the register REG. The register REG thus allows the value A×SS to be stored before the value LS+SS is available at the end of the long integration period TL. The output of the adder A1 is connected to an input of the multiplexer MX1 and to an input of the comparator CP1. The output of the comparator CP1 controls the multiplexer MX1 in a manner such that it supplies on output WDR of the circuit PPC1 the largest value from among the input values of the multiplexer MX1. Thus, the circuit PPC1 supplies a pixel value WDR given by the following formula:

$$WDR=MAX(LS+SS+A\times SS, R\times SS) \quad (3)$$

It is to be noted that the circuit PPC1 corresponds to the circuit PPC when the coefficient A is chosen to be equal to 0.

Figure 10:
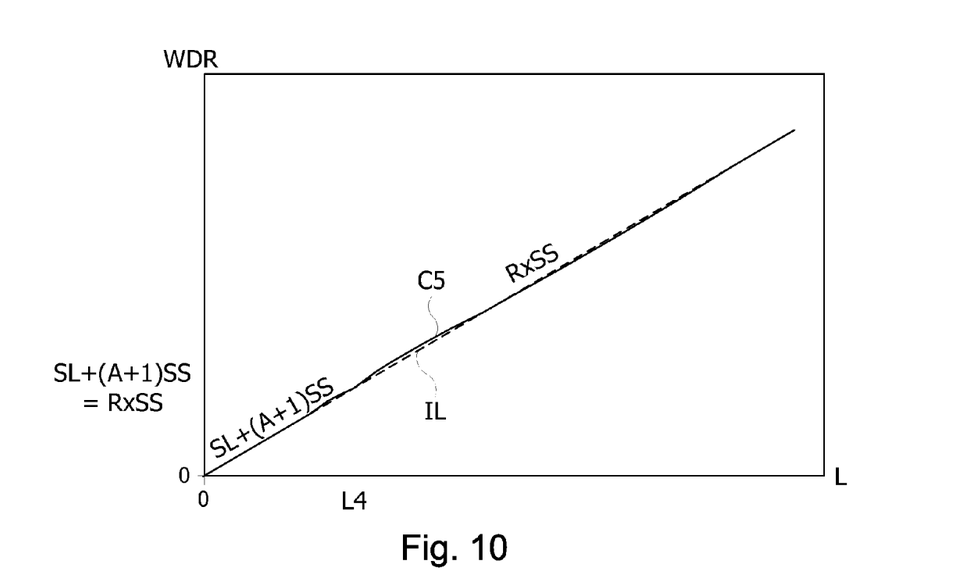
FIG. 10 shows a variation curve of the pixel signal on output of the circuit of FIG. 9 as a function of the lighting intensity of the pixel cell.

FIG. 10 shows a response curve C5 of the pixel cell circuit PXS coupled to the processing circuit PPC1, as a function of the lighting L of the pixel cell when the coefficient A has an optimum value comprised between 1 and 4, and in particular between 2 and 3. FIG. 10 shows that the curve C5 substantially follows the straight line IL throughout the entire dynamic range of the sensibility of the pixel cell, including around the junction point between the curves corresponding to the equations WDR=SL+(A+1)SS and WDR=R×SS, this point being reached when the pixel cell is subjected to a luminous intensity equal to L4.

Figure 11:
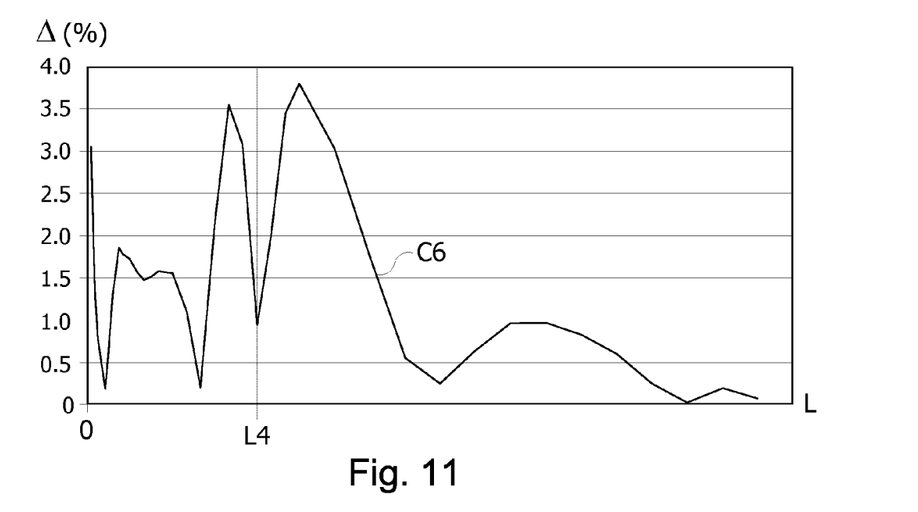
FIG. 11 shows a variation curve of a difference between the curve of FIG. 10 and a straight line corresponding to a linear response curve of the image sensor.

FIG. 11 shows a variation curve C6 of the difference between the curve C5 and the straight line IL. FIG. 11 shows that this difference remains less than 4% even when the lighting intensity of the pixel cell is around L4. It is to be noted that the numerical values indicated in FIGS. 8 and 11 depend in large part upon the pixel manufacturing technology. These numerical values are therefore only given as an example to allow for comparisons between the embodiments.

The value of the coefficient A may be adjusted following tests performed at the end of the image sensor fabrication process, as a function of performances of the image sensor that vary according to the sensor fabrication conditions. The value of the coefficient A may equally be adjusted in real-time as a function of the ambient temperature of the image sensor so as to compensate performance variations resulting from ambient temperature variations during the functioning of the image sensor.

Figure 12:
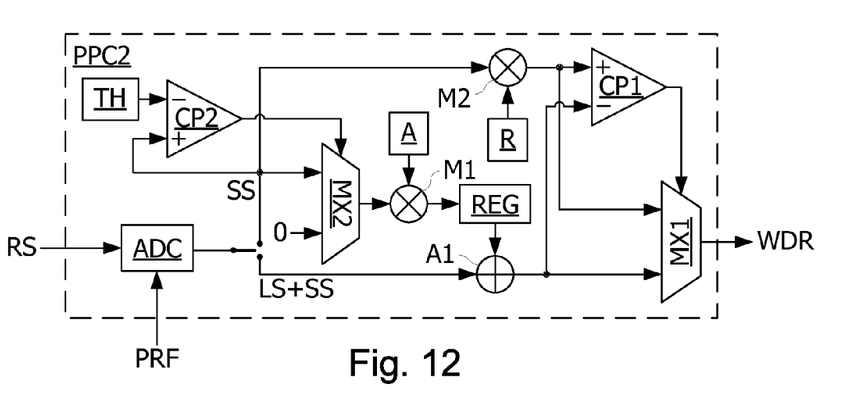
FIG. 12 shows a pixel signal calculation circuit, according to another embodiment.

FIG. 12 shows a processing circuit PPC2 for processing the signal RS on output of the pixel cell PXS, according to another embodiment. Circuit PPC2 differs from the circuit PPC1 in that the term A×SS of equation (3) is forced to 0 when the signal SS is less than a threshold value TH, before it is multiplied by the coefficient A. In this manner, the addition of noise to the resulting signal WDR when the pixel cell receives a low light intensity is avoided. Thus, with respect to the circuit PPC1, circuit PPC2 further comprises a register storing the threshold TH, a comparator CP2, and a multiplexer MX2. The comparator CP2 compares the signal SS to the threshold value. The multiplexer receives on input the signal SS and a null signal. The output signal of the comparator CP2 controls the multiplexer MX2 of which the output is connected to the input of the multiplier M1. Thus, the register REG receives either a null value when the signal SS is less than the threshold TH, or else the value A×SS in the opposite case.

It will clearly appear to the skilled person that the present disclosure is susceptible of diverse implementation and application variations. In particular, the disclosure is not limited to the pixel cell shown in FIG. 1. The disclosure may apply to other pixel cells such as a pixel cell in which certain N-channel transistors have been replaced by P-channel transistors. It simply matters that the pixel cell comprises a sense node wherein electrical charges may accumulated due to the effect of light, and a read node linked to the sense node by a component that may be controlled to transfer, at chosen moments, all or some of the electrical charges accumulated at the sense node, and that the pixel cell further comprises a component that may be controlled to initialize the read node, that is to say to evacuate the electrical charges accumulated at the read node, as well as a read circuit configured to supply a voltage proportional to the quantity of electrical charges at the read node.

The various embodiments described above can be combined to provide further embodiments. All of the U.S. patents, U.S. patent application publications, U.S. patent application, foreign patents, foreign patent application and non-patent publications referred to in this specification are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A process of controlling a pixel cell of an image sensor, the process comprising:
   initializing a sense node and a read node of the pixel cell;
   partially transferring electrical charges accumulated at the sense node since the initialization of the sense node, to the read node;
   completely evacuating electrical charges accumulated at the read node;
   partially transferring electrical charges accumulated at the sense node to the read node;
   obtaining a first pixel voltage corresponding to a quantity of electrical charges accumulated during a short integration period, the obtaining including performing a first measurement of electrical charges accumulated at the read node;

after performing the first measurement, completely transferring electrical charges accumulated at the sense node to the read node;

after completely transferring electrical charges accumulated at the sense node to the read node, obtaining a second pixel voltage for a long integration period by performing a second measurement of electrical charges at the read node, wherein the second measurement is performed without evacuating the electrical charges accumulated at the read node after performing the first measurement, the second pixel voltage obtained by performing the second measurement corresponding to the sum of the electrical charges accumulated during the short and long integration periods;

obtaining a first pixel lighting value corresponding to the first measurement and a second pixel lighting value corresponding to the second measurement, wherein obtaining the first pixel lighting value includes analog-digital converting the first pixel voltage and obtaining the second pixel lighting value includes analog-digital converting the second pixel voltage, wherein the analog-digital converting steps are performing using an analog-digital converter having a dynamic and the steps of transferring electrical charges accumulated at the sense node to the read node are controlled by pulses having amplitudes; and allowing the first pixel voltage to fully reach the dynamic of the analog/digital converter, the allowing including avoiding saturation of the analog-digital converter during the analog-digital converting steps by adjusting the amplitude of at least one of the pulses according to the dynamic of the analog-digital converter.

2. A process according to claim 1, comprising:

obtaining a pixel reference voltage by measuring electrical charges at the read node following the completely evacuating the electrical charges accumulated at the read node; and initializing an analog/digital converter using the pixel reference voltage prior to analog-digital converting the first and second pixel voltages.

3. A process according to claim 1, comprising:

obtaining a multiplied quantity by multiplying the first pixel lighting value by a ratio between the long and short integration periods;

determining which is a largest quantity: the multiplied quantity or the second pixel lighting value; and supplying a resultant pixel lighting value equal to the largest quantity determined in the determining step.

4. A process according to claim 1, comprising:

obtaining a first multiplied quantity by multiplying the first pixel lighting value by a coefficient;

obtaining a second multiplied quantity by multiplying the first pixel lighting value by a ratio between the long and short integration periods;

obtaining an added quantity by adding the first multiplied quantity and the second pixel lighting value;

determining which is a largest quantity: the second multiplied quantity or the added quantity; and supplying a resultant pixel lighting value equal to the largest quantity determined in the determining step.

5. A process of controlling a pixel cell of an image sensor, the process comprising:

initializing a sense node and a read node of the pixel cell;

partially transferring electrical charges accumulated at the sense node since the initialization of the sense node, to the read node;

completely evacuating electrical charges accumulated at the read node;

partially transferring electrical charge accumulated at the sense node to the read node;

obtaining a first pixel voltage corresponding to a quantity of electrical charges accumulated during a short integration period, the obtaining including performing a first measurement of electrical charges accumulated at the read node;

after performing the first measurement, completely transferring electrical charges accumulated at the sense node to the read node;

after completely transferring electrical charges accumulated at the sense node to the read node, obtaining a second pixel voltage for a long integration period by performing a second measurement of electrical charges at the read node, wherein the second measurement is performed without evacuating the electrical charges accumulated at the read node after performing the first measurement, the second pixel voltage obtained by performing the second measurement corresponding to sum of the electrical charges accumulated during the short and long integration periods;

obtaining a first pixel lighting value corresponding to the first measurement and a second pixel lighting value corresponding to the second measurement, wherein obtaining the first pixel lighting value includes analog-digital converting the first pixel voltage and obtaining the second pixel lighting includes analog-digital converting the second pixel voltageobtaining a first multiplied quantity by multiplying the first pixel lighting value by a coefficient;

obtaining a second multiplied quantity by multiplying the first pixel lighting value by a ratio between the long and short integration periods;

obtaining an added quantity by adding the first multiplied quantity and the second pixel lighting value;

determining which is a largest quantity: the second multiplied quantity or the added quantity;

supplying a resultant pixel lighting value equal to the largest quantity determined in the determining step;

comparing the first pixel lighting value to a threshold; and if the first pixel lighting value is less than the threshold, forcing the first pixel lighting value to zero before multiplying the first pixel lighting value by the coefficient.

6. A process according to claim 5, comprising adjusting the coefficient as a function of manufacturing conditions of the image sensor.

7. A process of controlling a pixel cell of an image sensor, the process comprising initializing a sense node and a read node of the pixel cell;

partially transferring electrical charges accumulated at the sense node since the initialization of the sense node, to the read node;

completely evacuating electrical charges accumulated at the read node;

partially transferring electrical charges accumulated sense node to the read node;

obtaining a first pixel voltage corresponding to a quantity of electrical charges accumulated during a short integration period, the obtaining including performing a first measurement of electrical charges accumulated at the read node;

after performing the first measurement, completely transferring electrical charges accumulated at the sense node to the read node;

after completely transferring electrical charges accumulated at the sense lode to the read node, obtaining a second pixel voltage for a long integration period by performing a second measurement of electrical charges at the read node, wherein the second measurement is performed without evacuating the electrical charges accumulated at the read node after performing the first measurement, the second pixel voltage obtained by performing the second measurement corresponding to the sum of the electrical charges accumulated during the short and long integration periods;

obtaining a first pixel lighting value corresponding to the first measurement and a second pixel lighting value corresponding to the second measurement, wherein obtaining the first pixel lighting value includes analog-digital converting the first pixel voltage and obtaining the second pixel lighting value includes analog-digital converting the second pixel voltageobtaining a first multiplied quantity by multiplying the first pixel lighting value by a coefficient;

obtaining a second multiplied quantity by multiplying the first pixel lighting value by a ratio between the long and short, integration periods;

obtaining an added quantity by adding the first multiplied quantity and the second pixel lighting value;

determining which is a largest quantity: the second multiplied quantity or the added quantity;

supplying a resultant pixel lighting value equal to the largest quantity determined in the determining step; and adjusting the coefficient in real-time as a function of an ambient temperature of the image sensor.

8. An image sensor, comprising:

pixel cells arranged in lines of pixels and in columns of pixels transversal to the lines of pixels, each pixel cell including pixel cell power source terminal, a photosensitive component, a first transistor, a second transistor, a sense node coupled to the photosensitive component, and a read node coupled to the sense node by the first transistor and coupled to the pixel cell power source terminal by the second transistor;

a pixel signal processing circuit configured to read each pixel cell; and a pixel control circuit configured to control each pixel cell, the pixel control circuit being configured to control a process that includes:
  initializing a sense node and a read node of the pixel cell;
  partially transferring electrical charges accumulated at the sense node since the initialization of the sense node, to the read node;
  completely evacuating electrical charges accumulated at the read node;
  partially transferring electrical charges accumulated at the sense node to the read node;
  obtaining a first pixel voltage corresponding to a quantity of electrical charges accumulated during a short integration period, the obtaining including performing a first measurement of electrical charges accumulated at the read node;
  after performing the first measurement, completely transferring electrical charges accumulated at the sense node to the read node;
  after completely transferring electrical charges accumulated at the sense node to the read node, obtaining a second pixel voltage for a long integration period by performing a second measurement of electrical charges at the read node, wherein the second measurement is performed without evacuating the electrical charges accumulated at the read node after performing the first measurement, the second pixel voltage obtained by performing the second measurement corresponding to the sum of the electrical charges accumulated during the short and long integration periods, wherein the processing circuit includes:
  an analog-digital circuit having an input and an output, the input being coupled to at least one of the pixel cells;
  a first multiplier configured to obtain a first multiplied quantity by multiplying the first pixel lighting value by a coefficient;
  a second multiplier configured to obtain a second multiplied quantity by multiplying the first pixel lighting value by a ratio between the long and short integration periods;
  an adder configured to obtain an added quantity by adding the first multiplied quantity and the second pixel lighting value;
  a first comparator configured to determine which is a largest quantity: the second multiplied quantity or the added quantity; and
  a first multiplexer configured to supply a resultant pixel lighting value equal to the largest quantity determined by the first comparator;
  a second comparator configured to compare the first pixel lighting value to a threshold; and
  a second multiplexer configured to force the first pixel lighting value to zero before passing the first pixel lighting value to the first multiplier.

9. An image sensor according to claim 8, wherein each pixel cell comprises:
  a third transistor having a control terminal coupled to the read node, a first conduction terminal coupled to the pixel cell power source terminal, and a second conduction terminal; and
  a fourth transistor having a control terminal configured a selection signal from the control circuit, a first conduction terminal coupled to the second conduction terminal of the third transistor; and a second conduction terminal configured to supply, to the pixel signal processing circuit, a pixel signal corresponding to the electrical charges at the read node.

10. A process of controlling a pixel cell of an image sensor, the process comprising
  initializing a sense node and a read node of the pixel cell;
  allowing electrical charges to accumulate at the sense node;
  partially transferring to the read node electrical charges accumulated at the sense node during a short integration period if the electrical charges accumulated are greater than a threshold;
  obtaining a first pixel voltage corresponding to a quantity of electrical charges transferred to the read node, the obtaining including performing a first measurement of electrical charges accumulated at the read node;
  after performing the first measurement, completely transferring electrical charges accumulated at the sense node to the read node;
  after completely transferring electrical charges accumulated at the sense node to the read node, obtaining a second pixel voltage for a long integration period by performing a second measurement of electrical charges at the read node, wherein the second measurement is performed without evacuating the electrical charges accumulated at the read node after performing the first measurement, the second pixel voltage obtained by performing the second measurement corresponding to the sum of the electrical charges accumulated during the short and long integration periods;

obtaining a first pixel lighting value corresponding to the first measurement and a second pixel lighting value corresponding to the second measurement, wherein obtaining the first pixel lighting value includes analog-digital converting the first pixel voltage and obtaining the second pixel lighting value includes analog-digital converting the second pixel voltage, wherein the analog-digital converting steps are performed using an analog-digital converter having a dynamic and the steps of transferring electrical charges accumulated at the sense node to the read node are controlled by pulses having amplitudes; and allowing the first pixel voltage to fully reach the dynamic of the analog/digital converter, the allowing including avoiding saturation of the analog-digital converter during the analog-digital converting steps by adjusting the amplitude of at least one of the pulses according to the dynamic of the analog-digital converter.

11. A process according to claim 10, comprising:

completely evacuating any electrical charges accumulated at the read node prior to partially transferring to the read node electrical charges accumulated at the sense node during the short integration period;

obtaining a pixel reference voltage by measuring electrical charges at the read node following the completely evacuating the electrical charges accumulated at the read node; and initializing the analog/digital converter using the pixel reference voltage prior to analog-digital converting the first and second pixel voltages.

12. A process of controlling a pixel cell of an image sensor, the process comprising:

initializing a sense node and a read node of the pixel cell;

allowing electrical charges to accumulate at the sense node;

partially transferring o the read node electrical charges accumulated at the sense node during a short integration period if the electrical charges accumulated are greater than a threshold;

obtaining a first pixel voltage corresponding to a quantity of electrical charges transferred to the read node, the obtaining including performing a first measurement of electrical charges accumulated at the read node;

after performing the first measurement, completely transferring electrical charges accumulated at the sense node to the read node;

after completely transferring electrical charge accumulated e sense node to the read node, obtaining a second pixel voltage for a long integration period by performing a second measurement of electrical charges at the read node wherein the second measurement is performed without evacuating the electrical charges accumulated at the read node after performing the first measurement, the second pixel voltage obtained by performing the second measurement corresponding to the sum of the electrical charges accumulated during the short and long integration periods;

obtaining a first pixel lighting value corresponding to the first measurement and a second pixel lighting value corresponding to the second measurement, wherein obtaining the first pixel lighting value includes analog-digital converting the first pixel voltage and obtaining the second pixel lighting value includes analog-digital converting the second pixel voltage;

obtaining a multiplied quantity by multiplying the first pixel lighting value by a ratio between the long and short integration periods;

determining which is a largest quantity: the multiplied quantity or the second pixel lighting value; and supplying a resultant pixel lighting value equal to the largest quantity determined in the determining step.

13. A process of controlling a pixel cell of an image sensor, the process comprising:

initializing a sense node and a read node of the pixel cell;

allowing electrical charges to accumulate at the sense node;

partially transferring to the read node electrical charges accumulated at the sense node during a short integration period if the electrical charges accumulated are greater than a threshold;

obtaining a first pixel voltage corresponding to a quantity of electrical charges transferred to the read node, the obtaining including performing a first measurement of electrical charges accumulated at the read node;

after performing the first measurement, completely transferring electrical charges accumulated at the sense node to the read node;

after completely transferring electrical charges accumulated at the sense node to the read node, obtaining a second pixel voltage for a long integration period by performing a second measurement of electrical charges at the read node, wherein the second measurement is performed without evacuating the electrical charges accumulated at the read node after performing the first measurement, the second pixel voltage obtained by performing the second measurement corresponding to the sum of the electrical charges accumulated during the short and long integration periods;

obtaining a first pixel lighting value corresponding to the first measurement and a second pixel Oiling value corresponding to the second measurement, wherein obtaining the first pixel lighting value includes analog-digital converting the first pixel voltage and obtaining the second pixel lighting value includes analog-digital converting the second pixel voltage;

obtaining a first multiplied quantity by multiplying the first pixel lighting value by a coefficient;

obtaining a second multiplied quantity by multiplying the first pixel lighting value by a ratio between the long and short integration periods;

obtaining an added quantity by adding the first multiplied quantity and the second pixel lighting value;

determining which is a largest quantity: the second multiplied quantity or the added quantity; and supplying a resultant pixel lighting value equal to the largest quantity determined in the determining step.

* * * * *